United States Patent [19]
Moseley

[11] Patent Number: 6,024,926
[45] Date of Patent: Feb. 15, 2000

[54] APPARATUS AND METHOD FOR HIGH AMPLITUDE ACOUSTICALLY RESONATING CAVITY FOR EFFECTING PHYSICAL PROCESSES

[76] Inventor: Thomas Stillman Moseley, 2501 Briggs Chaney Rd., Silver Spring, Md. 20905

[21] Appl. No.: 09/003,495

[22] Filed: Jan. 6, 1998

Related U.S. Application Data

[60] Provisional application No. 60/034,484, Jan. 7, 1997.
[51] Int. Cl.[7] ............................................. B06B 1/00
[52] U.S. Cl. ..................................................... 422/127
[58] Field of Search .................................. 422/127, 128, 422/20

[56] References Cited

U.S. PATENT DOCUMENTS 4,367,130  1/1983  Lemelson ........................... 422/128 X

*Primary Examiner*—Elizabeth McKane

[57] ABSTRACT

The invention relates to processing of gaseous feedstock material under high pressure and temperature. The desired high pressure and temperature is obtained by establishing a resonant high amplitude pressure wave in a volume contained within a shell. Adiabatic compression that occurs due to the resonant wave provides at least one region where high pressure and temperature appear periodically due to the periodic compression of the pressure wave. The gaseous material is passed through such regions.

22 Claims, 2 Drawing Sheets

APPARATUS AND METHOD FOR HIGH AMPLITUDE ACOUSTICALLY RESONATING CAVITY FOR EFFECTING PHYSICAL PROCESSES

CROSS REFERENCE TO RELATING APPLICATIONS

The present Application is a continuation-in-part of Provisional Application Ser. No. 60/034,484 filed on Jan. 7, 1997.

BACKGROUND OF THE INVENTION

DEFINITIONS

Adiabatic Compression

An adiabatic process is a process wherein no heat is transferred between the material undergoing the process and the surrounding environment. The temperature of a gas will increase during adiabatic compression even though it receives no heat from any source.

Gas/Gaseous

A gaseous material, i.e., a gas, may comprise may comprise a single gas or a mixture of gases in any combination. In addition, a mixture of gas and solid particles and/or liquid particles of such size that the mixture satisfactorily performs as a gas in an embodiment of my invention will also be called a gas.

Examples of gases according to my definition include: 1) pure oxygen, 2) a mixture of nitrogen, oxygen, argon, etc. (air), 3) a mixture of gasoline vapor in oxygen, 4) gasoline vapor in air, 5) liquid fuel (gasoline, diesel, alcohol) droplets in air and 6) a mixture of flour dust particles) in air. Of these examples, only 1) does not permit a chemical reaction within itself. 2) may form nitrous oxides under certain conditions. Examples 3), 4) and 5) are commonly thought of as being flammable or explosive but may not be either if the fuel/air ratio is outside the flammability limit. 6) is not commonly thought of as being explosive but can be, again depending on the "fuel"/air ratio and the fineness of the dust.

Throughstream

Throughstream references the major part of matter which appears as feedstock (defined under I.B.1 below) and becomes product (also defined under I.B.1 below). In the apparatus which is the subject of my invention, some of the atoms constituting the feedstock may be lost from the throughstream in passing through my apparatus while additional atoms may be picked up by the feedstream and appear in the product. The feedstream follows and is generally delineated by the stream of those atoms which pass from the feedstock supply or "source" to the product receiver or "sink" without regard to lost or gained atoms.

Inert Gas

As will be discussed herein below, a mixture of fuel and air may not be flammable if the ratio of fuel and air is outside certain limits. Such a mixture is to be considered to be inert for purposes of the present Specification. Broadly, an inert gas is a gas which does not undergo significant chemical reactions under the conditions to which it is exposed.

Under this definition and as will be understood from the following teachings, it is possible for a volume of fuel and air having a uniform composition throughout to be inert in one region of the volume which is at a low temperature and to be chemically active and not inert in another region where the temperature of the same composition is at a higher temperature.

Oxygen in the common usage is not considered to be inert since, if it is mixed with fuel, it may provide a combustible mixture: Nitrogen is commonly considered to be inert since no ratio of fuel and nitrogen is considered to be flammable.

Please note that, until mixed with fuel, oxygen is inert. For purposes of this Patent, inert refers to the properties that exist, not what properties could exist.

Pressure Wave Pressure Range

At any given point in a gas through which a sound is travelling, the sound wave of any amplitude will cause pressure variations which vary from a maximum to a minimum to a maximum over the time that one wave length passes that point. The pressure wave pressure range will be defined herein as the difference in the maximum and minimum pressures which appear during the passage of a wave past a point.

Chemical Reactions

Exothermic/Endothermic

Chemical reactions are commonly used to effect a desired transformation of one combination of chemical compounds (a "feedstock" having some particular composition) into another combination (a "product") by the process of chemical reaction.

A chemical reaction may release energy which characterizes an exothermic reaction or require the addition of energy which characterizes an endothermic reaction.

Reaction Temperature Effects

Rate of Reaction (Law of Arrhenius)

Increasing the temperature of the feedstock and thus the temperature at which the chemical reaction begins will increase the rate of reaction. The reaction rate as a function of temperature is approximately predicted by the Law of Arrhenius which states that the reaction rate, for otherwise constant conditions and a constant composition of the feedstock, is an exponential function of the absolute temperature. Thus, doubling the absolute temperature will increase the reaction rate by about 2.72 times.

Composition of Product

An increase in the reaction temperature will often result in a shift in the composition of the product resulting from reaction of a given feedstock composition. Thus, the reaction temperature may be varied to increase the proportion of desirable chemicals to undesired chemicals in the product.

Further, increasing the reaction temperature may increase the rate at which a first composition reacts to shift to another composition with the balance between first and final compositions shifting with the increase in temperature.

The product of a chemical reaction may include both desired and undesired components. For example, a product may be contaminated with unreacted feedstock or undesired chemical compounds formed during the chemical reaction.

Temperature Schedule

Yet further, the temperature history during a chemical reaction will also affect the reaction rate and the composition of the product stream.

The particular temperature schedule which is optimal for producing desired chemicals depends the composition of the feedstock, the desired product and the acceptable costs.

Methods of Heating Feedstock

Heat Exchange

When it is desired to heat a feedstock, the chemical engineer balances numerous factors so that the initial and operational costs are minimized for a given amount of product.

Heating methods have included the use of a heat exchanger (such as a counterflow heat exchanger) in combination with a heat source such that the feedstock passing to a reactor is heated by thermal contact with the hot product stream leaving the reactor and then heated yet further by the heat source after which the product stream leaves the reactor. Since there will always be a temperature differential between the feedstock and the product stream in a heat exchanger, heat is lost with the product stream. This heat may be minimized by increasing the efficiency of the heat exchanger but at an increased cost associated with the improved heat exchanger.

Exothermic Heating

In the case of an exothermic reaction, heat is released in the reaction which accelerates the chemical reaction and heats the material such that the temperature of the product is greater than the temperature of the feedstock. However, the heat released may be less or more than is desired to obtain a desired rate of heating or a desired reaction temperature.

Example—Production of $CO_2$ and $H_2O$ by Burning Fuel in Air

Some of these points will be made clear by considering oxidation of gasoline vapor in air where the heat released in one region of the feedstock by oxidation of the fuel (e.g., combustion of the fuel) serves to preheat the gasoline and air feedstock in an adjacent region so that the adjacent region is able to chemically react quickly: The process continues smoothly through successive regions of the feedstock and is commonly manifested as a flame front moving through the feedstock leaving behind hot product gas.

If now the desired product gas is carbon dioxide, water and air, the heat in the product represents lost energy. Further, if the reaction temperature is allowed to get too high, nitrogen in the air will combine with oxygen in the air to form nitrous oxides. However, if the temperature of the product is lowered gradually after a high temperature reaction in which nitrous oxides are formed, these oxides have adequate time to reform into oxygen and nitrogen, the major components of air. Thus, the temperature history or schedule will determine the final proportion of undesired nitrous oxides in the product.

Comments—Flammability Limit as a Function of Temperature

The temperature history or schedule may be modified such as by varying the fuel/air ratio of the feedstock or controlling heat loss from the reaction space. The chemical engineer may design apparatus which will recover some of the heat energy such as by performing the reaction within an internal combustion engine which produces useful work or by means of a heat exchanger as described above to use a heat exchanger to recover heat energy from the product.

At any temperature, there are flammability limits which are the extremes fuel/air ratio between which combustion may occur.

If a method could be found to temporarily heat a fuel/air mixture, the temperature determined reaction rate would increase and a rapid reaction rate such as is associated with a flame would again appear even at a fuel/air ratio which is too low to support a flame at a lower temperature.

Indeed, a chemical rector which "lends" energy for increasing the temperature of a feedstock which thus undergoes a heat driven chemical reaction and which recovers all of the loaned energy from the product before it leaves the reactor would be very desirable with respect to energy efficiency.

Temperature Raising Methods

An efficient method of heating the mixture which would make the heat of reaction (exothermic or possibly endothermic) independent of the heat supplied to heat the mixture would be desirable and allow new design freedoms in chemical system design.

There are three basic methods of raising the temperature of a material: 1) Thermal energy transfer by radiation and/or conduction (note that convection is usually regarded as a heat transfer process but actually relates to the movement of heat energy by moving a material rather than by changing the temperature of the material), 2) release of heat energy within the gas such as by combustion or 3) by compression such as adiabatic compression.

Conduction/Radiation

Conduction is used for heat transfer in a heat exchanger but has the problems noted above, e.g., initial cost, and inefficiency such as due to heat loss. Heat exchangers have maintenance problems such as due to dust and corrosion. Heat transfer by radiation is generally even less efficient.

Internal Heat Release

Heating by adding heat within the feedstock leaves heat in the product stream as noted above which heat is difficult to usefully remove. Combustion is an example of heating by internal heat release.

Adiabatic Compression

Adiabatically compressing a gaseous feedstock to thereby heat the feedstock to cause an increased rate of chemical reaction is used to ignite the mixture in Diesel engines and contributes to "knock" in a gasoline engine. Compression heating contributed to the ignition of the fuel/air mixture in the WW II German V1 "Buzz Bomb" pulse jet engine.

SOUND—Amplitude/Linearity, Nodes

Sound waves are normally studied by acousticians and are generally thought to relate to small pressure and velocity variations in a medium. Pressure waves are normally studied by engineers and relate to large pressure and velocity variations in a medium. However, the distinction between them is somewhat arbitrary and is broadly based on whether or not linear equations can be used to adequately describe the wave phenomenon or system under study.

A velocity node in small amplitude sound is a location in a medium containing a standing wave pattern where the velocity is constant. A pressure node in a small amplitude sound is a location in a medium containing a standing wave pattern where the pressure is constant. Pressure and velocity nodes will not be at the same place in the medium but are separated by a quarter of the wave length of the standing wave. A pressure node in a large amplitude sound standing wave system is a location where the pressure variation is minimal.

PRIOR ART

Bodine, Jr. in U.S. Pat. No. 2,745,861 discloses a process and chemical reactor apparatus using an acoustic standing wave in a confined gas body whereby powdered coal can be burned under fuel rich conditions. This Patent discloses tubular reactor designs and briefly discloses a spherical design (FIG. 5 and Column 18, line 72 et seq.) which uses tubes for conveying materials into and out of the reactor. Rates of combustion during the oscillation cycle is discussed (e.g., Column 2, line 66 et seq.) as is the use of quarter wave high impedance tubes in connection with introducing air into the reactor (e.g., Column 5, line 21 et seq.). Air and fuel supply pipes are disclosed in connection with the spherical embodiment of FIG. 5 (Column 18, line 11 et seq.)

BRIEF SUMMARY OF THE INVENTION

One object of the present invention is to provide apparatus wherein a quantity of feedstock gas is introduced into a cavity in which a large amplitude pressure wave resonates, causing the feedstock to pass through or near a velocity node at which node high pressures are periodically present due to the resonant pressure wave and where the velocity node is not near a wall of the vessel or shell in which the resonance occurs and providing means to direct the feedstock to said velocity node which means minimally interferes with the resonating wave.

An object of the present invention is to provide a resonant cavity chemical reactor wherein pressure waves in the cavity provide adiabatic compression and thus adiabatic heating of a feedstock to encourage a desired chemical reaction in the reactor to cause the feedstock to be reacted to form product.

Another object of the present invention is to provide a resonant cavity chemical reactor which is based on a body of revolution.

Yet another object of the present invention is to provide a resonant cavity chemical reactor which is based on a body of revolution and wherein a first velocity node of the pressure waves is on or near the axis of the body of revolution.

Another object of the present invention is to provide a spherical resonant cavity chemical reactor wherein one velocity node is at the reactor wall and a second velocity node is at or near the center of the reactor.

A further object of the present invention is to provide a spherical resonant cavity chemical reactor having a dividing wall which directs feedstock to pass near the velocity node which is near the center of the reactor.

An additional object of the present invention is to provide a resonant cavity chemical reactor which is based on a body of revolution and having a nozzle which causes the throughstream to pass near a velocity node which is near the axis of the reactor.

Another object of the present invention is to provide a modular scheme for conduits for introducing feedstock into or removing product from a resonant chemical reactor such that pressure variations and energy associated with the resonating gas in the reactor is not lost into the feedstock source or the product sink.

Still another object of the present invention is to provide a resonant cavity chemical reactor which is based on a body of revolution about an axis and wherein a first velocity node of the pressure waves is on or near the axis and wherein a throughstream having little or no rotation passes along the axis while a second body of gas within the cavity rotates about the throughstream at a rate greater than the rate of rotation of the throughstream so that centrifical effects tend to maintain separation between the throughstream and the surrounding body of gas.

Yet another object of the present invention is to provide a resonant cavity chemical reactor which is based on a body of revolution about an axis and wherein a first velocity node of the pressure waves is on or near the axis so that the wall of the reactor sees small pressure variations relative to those present at the first velocity node so that the strength requirements of the reactor wall are not great.

BRIEF DESCRIPTION OF THE FIGURES AND LISTING OF ELEMENTS

Figure 8:
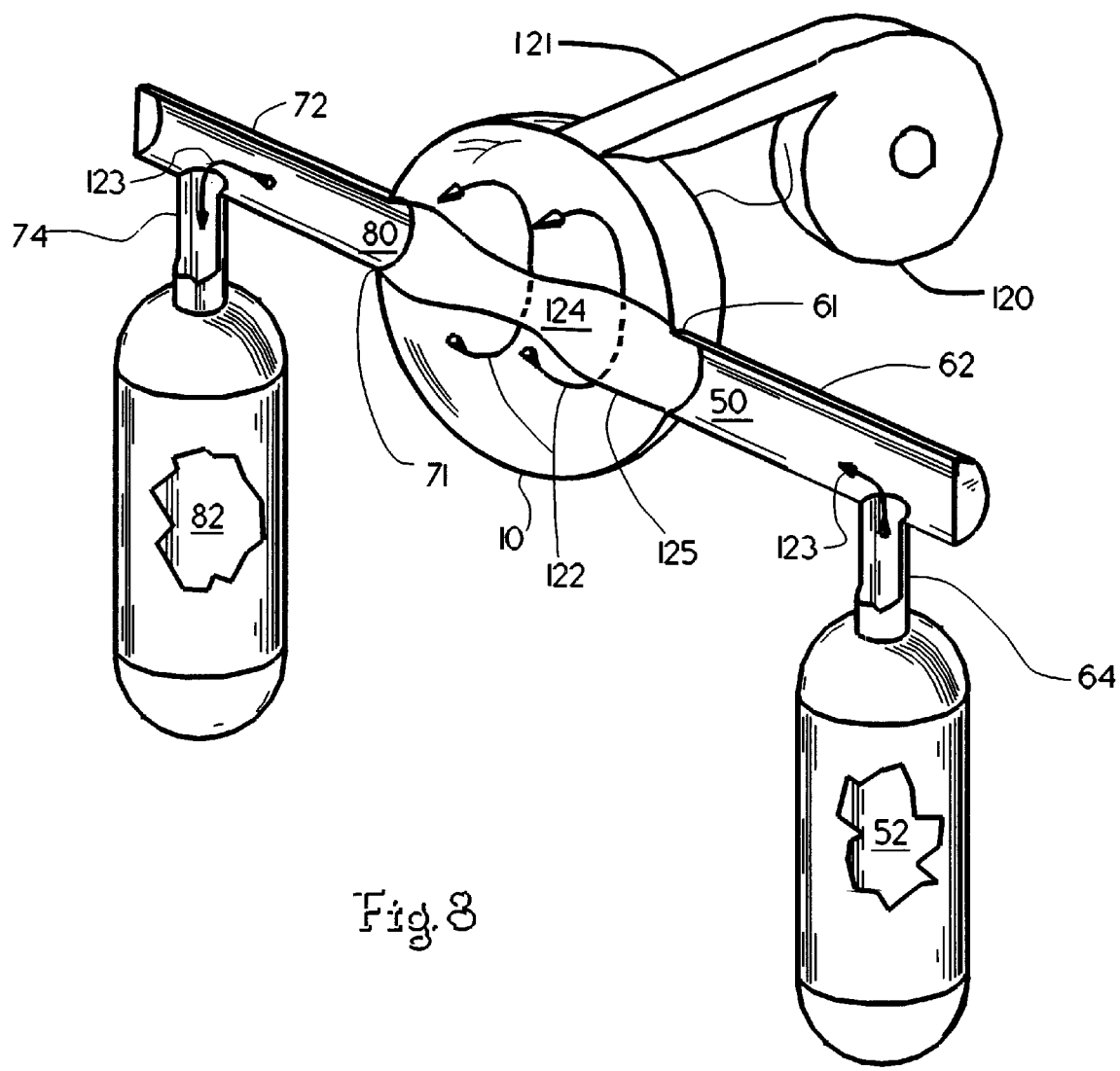

FIG. 8 is a perspective cross section schematic drawing which illustrates an arrangement for allowing gas to enter or exhaust from a resonant cavity chemical reactor according to the present invention while minimizing pressure fluctuations exterior to the reactor, e.g., minimizing pressure fluctuations passed upstream into a feedstock source or passed downstream into a product sink and showing a method for directing product gas to a specified region in a resonant reactor.

Figure 1:
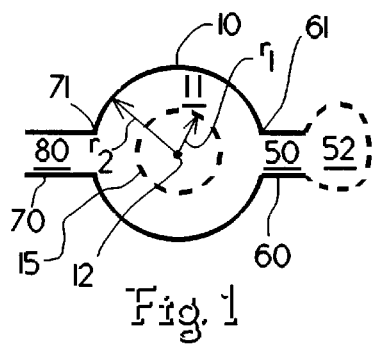
FIG. 1 is a cross section schematic drawing which sets forth the elements of a basic apparatus and selectively shows features which are helpful in understanding the principles of my invention.

10—spherical shell
11—interior volume in spherical shell 10
12—center of interior volume 11
15—spherical region at about the center of 11
20—separating wall in 11
21—aperture in 20
30—first portion of 11 defined by 20 and 10
31—second portion of 11 defined by 20 and 10
50—feedstock
51—optional feedstock nozzle (exhausting at 12)
52—feedstock source
53—exhaust of nozzle 51 (near point 12 and spherical region 15
60—conduit bringing in feedstock
70—conduit exhausting product
62—capped resonant tube in feedstock source system
72—capped resonant tube in product exhaust system
61, 71—apertures providing communication between 11 and tubes
63, 73—caps on ends of tubes 62 and 72
64, 74—connecting tubes attached at pressure nodes to tubes
80—product
82—product sink
100—hemispherical shell
105—wall used with the spherical half shell
110—volume in hemispherical volume
111—volume contained within a resonant cavity
112—vessel
120—blower
121—nozzle
122—rotating gas (represented by arrows representing motion of the rotating gas)
123—arrows indicating motion of through stream 124
124—throughstream Elements and features appearing in the various Figures and having both the same function and apparent shape have been assigned the same identifying numbers. Thus, the spherical shell 10 in FIG. 1 is likewise identified as element 10 in FIGS. 2, 3, 4, 5 and 6. In contrast, the separating wall in FIG. 3 is designated by the number 20 while the separating element in FIG. 4 designated by 51 since, while the separating function in the two embodiments of these elements is similar, the shapes of these elements are different.

DETAILED DESCRIPTION OF THE INVENTION

Principles

Looking at FIG. 1, 10 is a spherical shell which contains a gaseous material within interior spherical volume 11 which volume 11 is within the inner surface of the spherical shell 10.

Point 12 is located at or near the center of the interior volume 11 and is located at the central pressure node of a standing wave pattern as described hereinbelow.

Feedstock 50 is placed in and about the point 12 (such as within the spherical region 15 and having a radius $r_1$) while a radial standing pressure wave is caused to appear in the gaseous material which is in the interior volume 11. The standing wave is conveniently thought of as being the lowest frequency which may be maintained in the interior volume 11 as a standing wave. However, higher frequencies, essentially harmonics of the lowest frequency, may be present. The composition of the gas in interior volume 11 and outside of region 15 is conveniently comprised of feedstock 50 and/or product 80 but may be any other gas including a chemically inert gas.

It will be obvious that the gaseous material filling the interior volume 11 cannot pass through the interior surface of the spherical shell 10 and thus the velocity perpendicular to this surface at this surface will be zero. By radial symmetry, there will be no velocity parallel to this surface and thus the total velocity is zero at the interior surface of the spherical shell 10.

Point 12 is located at the point nearest to the center of the interior volume 11 where the velocity of the material in the interior space 11 caused by the standing wave is also zero: That such a point exists is not only understood from acoustics but must evidently exist due to radial symmetry. Due to radial symmetry, it will be understood that the resonant pressure wave within the interior space 11 is associated with oscillatory motions of the surrounding the spherical region 15 which oscillatory motions are radially oriented with respect to the spherical region 15.

In acoustics, a velocity node in a low amplitude standing sound wave is a place where the pressure has a spatially localized maximum variation in pressure.

Consider now a small chemical explosive device suspended in a large volume of air. Upon detonation, such a device very rapidly changes explosive material into a relatively hot, high pressure gas which radially expands and displaces the surrounding air producing an expanding pressure pulse or wave. The gases produced by the explosive device cool as they expand and this expansion is largely adiabatic. Note that the gases generated by the explosive device do not have to travel far from the point where the explosive device was located in generating the pressure wave in generating the pulse.

Supposing now that a small explosive device were located in FIG. 1 at point 12 in the interior volume 11. Of necessity, the explosive device is of finite dimensions but may be approximated by a point source which we may regard as generating a radially symmetric and expanding pressure wave which travels radially outwardly from the point 12.

If the wall of the spherical shell 10 is a perfect pressure wave reflector and is a perfect sphere, then the wave energy and momentum will be reflected and returned to the point 12. Gaseous material produced by the explosive device (probably now intermixed with surrounding air) would be recompressed adiabatically back up to the same pressure and temperature that were present at the initial detonation.

Of course, these gases would again expand and a resonant standing wave pattern would be established within the interior volume 11 as the pressure wave rebounded between the interior surface of the spherical shell 10 and the point 12. Since the amplitude of the pressure wave is large, the rebounding pressure wave will tend to reform into a shock wave.

As a practical matter, high temperature gases radiate light energy which represents a loss from the system to the shell 10. Also, the spherical shell 10 is not perfectly rigid and thus would absorb some energy from the pressure wave which is reflected on this surface. Note that a massive rigid shell 10 would tend to reflect the pressure pulse more perfectly than a thin flexible shell 10.

Further, the temperature variation appearing in the gaseous material adjacent to the interior surface of the spherical shell 10 due to the adiabatic compression and expansion of this gaseous material would cause heat to be transferred to and from the shell 10 in such a phase relationship with respect to the pressure wave that energy would be lost from the pressure wave. Provision of an insulating layer on the interior surface of the shell 10 would minimize heat transfer to and from the shell 10.

Because of real world effects, the pressure wave would decay to some degree with each cycle of expansion and compression as the pressure pulse resonates in the interior volume 11.

Embodiments

Figure 2:
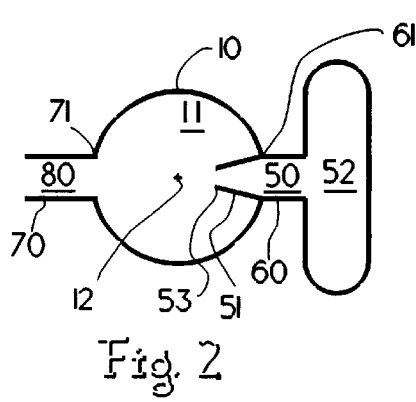
FIG. 2 is a cross section schematic drawing which shows a first embodiment of the present invention in which a nozzle is used to help direct the throughstream.
Figure 3:
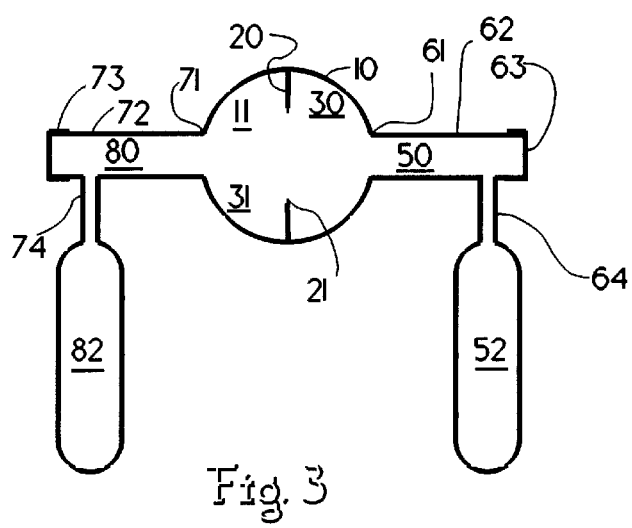
FIG. 3 is a cross section schematic drawing which shows a second embodiment of the basic invention wherein resonant tubes are used to provide flow of material into and out of a resonant cavity chemical reactor.

In FIGS. 1 and 2, feedstock 50 is passed through conduit 60 through aperture 61 into spherical shell 10 and into the interior volume 11 where it passes into the spherical volume 15. Conduit 70 passes product from interior volume 11 through aperture 71 in shell 10.

In the embodiment of FIG. 2, feedstock 50 from feedstock source 52 passes sequentially from source 52, through conduit 60, through nozzle 51 and the nozzle exit 53 into the interior volume 11 in the vicinity of point 12. While not shown, a nozzle could be used to draw product 80 from the vicinity of point 12 and into conduit 70. Alternately, two nozzles could be used, one directing feedstock 50 into the vicinity of point 12 and one drawing product 80 from the vicinity of point 12.

In FIG. 3, tube 62 is sealed and closed by cap 63 on one end thereof with the other end being in communication with the interior volume 11 through aperture 61 in shell 10. The tube 62 is of such length that the frequency which is resonant within the interior volume 11 is also resonant within the tube 62.

Within tube 62, there will be a velocity node at the cap 63 and at the aperture 61 and a pressure node (based on minimum pressure fluctuation in large amplitude resonance) in the tube 62 at one or more intermediate points. If tube 62 is of such length that it contains a single wavelength, then the pressure node will be in the tube 62 as shown in FIGS. 3, 4, 5, 6 and 7.

As noted above, the pressure variation at a pressure node is minimal. Thus, if an additional pipe 64 is connected to the tube 62 at a pressure node such that the interior of the tube 62 is in communication with the interior of the pipe 64, there will be a decrease in the pressure variation seen in pipe 64 at the end joining to conduit 62 compared to the variation seen at the ends in conduit 62. However, feedstock 50 may pass relatively freely from the source 52 through pipe 64 into tube 62 and thence into the interior volume 11 in spherical shell 10.

The tube 62, cap 63 and connecting tube 64 together form a wave isolation and flow passing module. Elements 72, 73 and 74 likewise comprise a wave isolation and flow passing module.

A similar arrangement may be used to allow relatively free passage of product from the interior volume 11 in shell 10 through aperture 71 into tube 72 and thence into pipe 74 joined at a pressure node in pipe 74 and thence to a product sink 82 while permitting little of the pressure wave energy to leave the resonant system by the same path.

Also in this embodiment, a separating wall 20 divides interior volume 11 into two partial volumes 30 and 31. As shown in FIG. 3, aperture 61 is in that portion of the shell 10 which encloses the partial volume 30 while aperture 62 is that portion of the shell which encloses the partial volume 31.

An aperture 21 is provided in the separating wall 20 near the point 12 so that partial volume 30 is in communication with partial volume 31. Separating wall 20 is essentially a circular disk having a centered circular aperture 21.

As will be evident, feedstock 50 which enters pipe 64 from feedstock source 52 and passes through tube 62 will enter the partial volume 30 and pass through the aperture 21 and into the partial volume 31. If now resonance in the interior volume 11 causes heating of the feedstock 50 during the high pressure phase of the pressure wave as it passes through the spherical region 15 located generally at or within the aperture 21 in the separating wall 20, all of the feedstock 50 will be forced through the heating region so that all of the feedstock 50 is heated and chemically reacted to form product 80. Product 80 then passes into the partial volume 31 and to the product sink 82 through the aperture 71, tube 72 and pipe 74.

The separating wall 20 is preferably radially oriented so that the oscillations of the gaseous material in the interior volumes 30 and 31 are parallel to the surfaces of the separating wall 20. The separating wall 20 thus sees balanced pressures on either side and thus may be of relatively light construction. The separating wall 20 may be flat or conical or any other shape which provides the preferred radial orientation of the wall surfaces. Indeed, the nozzle 51 shown in FIG. 1 is shown as having a taper and thus could be regarded as being a truncated conical separating wall. A pipe of constant diameter interferes with the radial standing wave pattern particularly when the diameter of the nozzle is sized to allow optimal quantities of feedstock 50 to pass therethrough.

Figure 5:
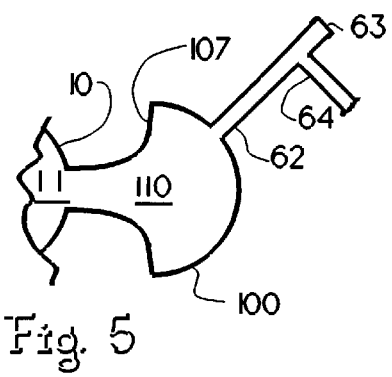
FIGS. 4, 5 and 6 are cross section schematic drawings which show apparatus to provide flow of material into and out of a region undergoing high amplitude pressure waves wherein the pressure waves are minimally communicated to the feedstock source and the product sink.
Figure 6:
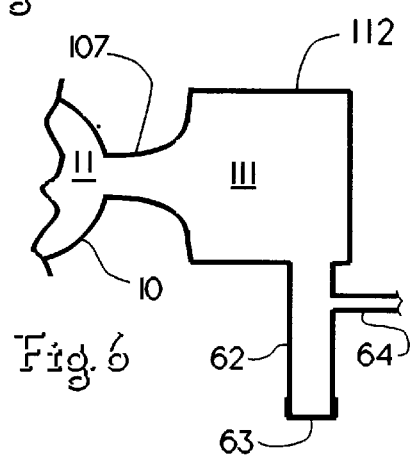
Figure 4:
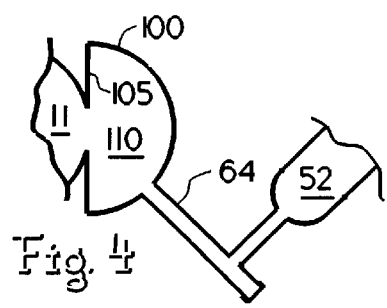

FIGS. 4, 5 and 6 show alternate means for coupling the spherical shell 10 and a resonant cavity which provide for transport of a gas into or out of the interior volume 11 while minimizing losses of pressure wave energy from the internal volume 11 into the gas source or gas sink.

Feedstock 50 and product 80 are supplied to and withdrawn from the interior volume 11 by the resonant tube systems shown in FIG. 2 or the devices of FIGS. 3, 4 and 5. The movement of the throughstream 5 (made up of the feedstock 50, the product 80 and the transitional composition, these appearing along the length of the throughstream) comprise a drift motion onto which the oscillatory motions associated with the pressure wave resonance are superimposed.

FIG. 4 shows a system wherein a hemisphere structure comprising a spherical half shell 100 and a circular wall 105 spanning the opening of the hemispherical shell 100 somewhat in the manner of a kettle drum.

The wall 105 is located such that the center of the wall is roughly tangent to the shell 10. Communication between the interior volume 11 in the shell 10 and the hemispherical interior volume 110 is provided between matching apertures in these nearly tangent surfaces which apertures together make a single communication aperture. By making the diameters of the shell 10 and the half shell 100 such as to provide a common resonant frequency in their interiors, the amplitude of pressure waves in the hemispherical interior volume 110 will be much less than the amplitude appearing the interior volume 11, the exact proportion being roughly equal to the ratio of the area of the communicating aperture to the surface area of the hemispheric shell. In this embodiment, the interior surface of the shell 100 will be at a velocity node and thus see a locally large variation in pressure through a pressure wave cycle but the variation will be proportional to the strength of the pressure wave at this surface.

This hemispheric arrangement may be used to allow direct supply or withdrawal of gaseous material to and from the interior volume 110 and thus 11. Thus feedstock may be introduced or product withdrawn by means of this hemispheric arrangement while involving minimal pressure fluctuations in the exterior supply system or product removal system. We may designate a minimum temperature and/or pressure which is to be attained in acting upon the feedstock 50 and determine a radius centered at or near point 12 within which the feedstock 50 will be adiabatically compressed to the designated state or to a higher pressure and temperature. It is convenient though not necessary that this radius be equal to of greater than $r_1$.

The hemispheres 100 in FIGS. 4 and 5 may be spherical half spheres but could be more or less than half of a sphere with the surfaces 105 and 107 shaped accordingly. For example, wall 105 could be in the form of a truncated cone rather than the flat wall shown in FIG. 4 with the spherical surface 100 subtending an angle such that the juncture between the wall 105 and the periphery of surface 100 is 90°.

The embodiment of FIG. 5 is generally similarly to that shown in FIG. 4 except that a generally exponentially shaped connecting tube (similar to an "exponential horn") provides communication between the interior volume 11 and the interior 110 which is contained within the hemispherical shell 100 and the flared portion of the connecting tube 107. The periphery of the flared portion of the exponential connecting tube 107 is joined to the periphery of the hemispheric shell 100 while the small end may be joined to an aperture in the spherical shell 10. The exponentially shaped connecting tube may be extended into the interior volume 11 to provide a nozzle functioning like and generally similar to the nozzle 51 in FIG. 2. The extension may continue the exponential shape of the connecting tube 107 but will preferably be modified toward the tapered shape discussed above if the curvature of the nozzle wall varies too far from the radially oriented surfaces discussed above as will be the case if relatively large quantities of product 50 are to be processed.

FIG. 6 shows a generally exponentially shaped connecting tube 107 which has the flared lip joined to a relatively large resonant cavity 111 contained within vessel 112 which of is a suitable shape to have the desired resonant characteristics. This Figure shows vessel 112 to comprise a large diameter tube capped at the end opposite to the exponential shaped connecting tube with a wave isolation and flow passing module comprising elements 62, 63 and 64.

Figure 7:
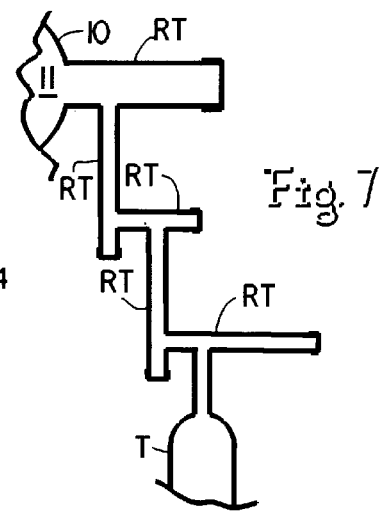
FIG. 7 is a cross section schematic drawing which illustrates an arrangement for allowing gas to enter or exhaust from a resonant cavity chemical reactor according to the present invention while minimizing pressure fluctuations exterior to the reactor, e.g., minimizing pressure fluctuations passed upstream into a feedstock source or passed downstream into a product sink.

FIG. 7 shows an arrangement comprising a succession of wave isolation and flow passing modules which allow passage of gas from tank T to interior volume 11 (or alternately from interior volume 11 to tank T) by means of the resonant tubes RT.

In FIG. 8, blower 120 (or a functionally similar gas impelling device) forces a gas through intake 121 which directs the gas tangentially into spherical shell 10 such that the gas is caused to rotate within the spherical shell 10. The rotating gas and the direction of the gas are represented by arrows 122. The rotating gas 122 is preferably inert.

Feedstock 50 is passed from feedstock source 52 and into the spherical shell 10 at a rotation rate which is less than that of the gas 122.

Due to centrifugal effects, the gas 122 tends to not move radially inward and thus not cross the tubular boundary 125 (which may be irregular in shape as suggested in this Figure). The gas 122 thus does not mix significantly with the throughstream 124. Thus, product 50 is constrained by the fluid dynamics to pass near the center of the spherical shell 10 and thus through and near the region of the resonant pressure wave system which sees the greatest pressures and temperatures. The product gas is preferably non-inert under the conditions that exist periodically near the center of the spherical shell 10 at such times as the pressure and temperature in this region are elevated due to the resonant pressure wave existing in the spherical shell 10.

The feedstock 50 is reacted to yield the product 80 by the high temperatures in this central region which product 80 is then passed through the resonant tube 72 and connecting tube 74 to the product sink 82.

Arrows 123, which indicate the flow of throughstream 124, are somewhat misleading in that they show only the drift velocity of the throughstream and do not show the back and forth oscillatory motion of the throughstream that actually is present.

would be possible in principle to keep a quantity of inert gas 122 within the interior volume 11. The gas 122 constricts and releases the throughstream 124 which is passing therethrough with the throughstream 124 containing within it the same resonant pattern.

FIGS. 3, 4, 5, 6, 7 and 8 which disclose the use of resonant tubes 62 and connecting tubes 64 (elements RT in FIG. 7) (note that the connecting tube of one wave isolation and flow passing module near to the resonant interior volume 11 can double as the connecting tube in the next wave isolation and flow passing module further from the interior volume 11) are as long as half or full waves (or an integer multiple of half waves) while the connecting tubes join at pressure nodes which are found at quarter wave distances which are not half wave distances. FIG. 7 shows in sequence from interior volume 11 to tank T: a full wave tube, a full wave tube, a half wave tube, and two full wave tubes while the junctures are at the first quarter wave location, the third, the first (there being no third position possible in a half wave tube), the third and the first quarter wave locations.

The invention disclosed herein has particular application wherein the feedstock is slightly exothermic and provides only just enough energy to maintain the resonance in the apparatus. The invention may be modified to use feedstock which is significantly exothermic but means to absorb the excess energy will be needed. Compression ignition may be used.

The resonant pressure waves may be started by sparking an explosion such as near point 12 in the embodiment of FIG. 2, by introducing sound energy by means of loudspeakers or other transducers, shaking the apparatus at an appropriate frequency, etc.

The following is an illustrative estimation which shows that the desirability of using a tapered nozzle as nozzle 51 to introduce feed stock 50 into the central region of the interior volume 11 near point 12 particularly when the radial motions of the gases in the interior volume are extreme, that is, high pressures and temperatures are obtained.

Suppose we wish to use a 5 ft diameter spherical shell to contain a resonant pressure wave. Feedstock is supplied at 15 PSI and at 90° F. and reacts satisfactorily at 1540° F. (about 550° R and 2000° R respectively). Assume that $C_p$ and $C_v$ are 0.238 BTU/lb$_m$ ° R and 0.17 BTU/lb$_m$ ° R respectively. Let $k=C_p/C_v=1.4$ For approximation purposes, suppose that the speed of pressure wave in the spherical shell will equal to the speed of sound of the gas or 1100 ft/sec (this value is probably low by at least 20% for the problem set forth).

The resonant frequency of the pressure wave will be (1100 cycles/sec)/(5 ft/cycle) or=220 cycles/sec=220 Hz.

The peak pressure, density and temperature will be inside a reacting region defined by a spherical surface at which surface the desired temperature of 1540° F. is found. We may designate a minimum temperature and/or pressure which is to be attained in acting upon the feedstock 50 and determine a radius centered at or near point 12 within which the feedstock 50 will be adiabatically compressed to the designated state or to a higher pressure and temperature. It is convenient though not necessary that this radius be equal to of greater than $r_1$. Estimating, the density and pressure at the surface of the region where the target temperature is obtained will be:

$$P=(2000/550)^a \times 15 \text{ PSI}=1375 \text{ PSI (Absolute)}$$

$$[a=k/(k-1)=3.5]$$

The ratio of volume of the feedstock gas in the source compared to the volume of the gas in the reaction region is (based only on the density at the surface of the reaction region—the density, temperature and pressure will be higher inside this surface):

$$V_{ratio}=(2000/550)^b=25.2$$

$$[b=1/(k-1)=2.5]$$

If the diameter of the reaction region is 1 ft (representing 1/125th of the total volume in the spherical shell of the reactor), then $4/3 \times 3.1415 \ldots \times (1/2)^3$ ft$^3$=0.52 ft$^3$ is within the reaction region. At 220 Hz, about 115 ft$^3$/sec of compressed gas could be processed. Uncompressed gas to be processed would be 115 ft$^3$/sec×25.2 or 2902 ft$^3$/sec.

It is desirable to have a low drift speed so that the incoming feedstock does not "blow" the resonant pattern off center and to allow the feedstock gas (throughstream) to reside in the reaction region a significant time so that the reaction may be driven to completion. Assume a drift speed of 50 ft/sec and 100 cycles for processing.

Then, the uncompressed gas will be processed at a rate of 29.02 ft$^3$/sec which requires that the diameter of the resonant tube is about 10 inches.

Note that a 10 inch constant diameter tube brought to within a few feet of a body of fluid varying in diameter between 1 ft and $(25.2)^c$=2.9 ft (where $c=1/3$) will clearly disturb the radial motions of the gaseous material within the interior volume 11.

A better design would provide for a larger diameter resonant tube 62 so that the drift velocity at the exit of a tapered nozzle would be acceptably low while not disturbing the radial motions associated with the resonant pressure wave in the reactor.

Data relating to explosions (rather than low amplitude sound) indicates that peak pressure falls off with radius following the inverse square law so that a peak pressure at the spherical shell would be on the order of $(1/5)^2 \times 1375$ PSI or 55 PSI.

I claim:

1. Apparatus comprising:

a source of feedstock gas, a rigid shell defining an enclosed interior volume, first means for conducting a first quantity of said feedstock gas from said source of feedstock gas to a first specific region within said enclosed volume within said rigid shell, a quantity of inert gas located within said rigid shell, wherein a resonant pressure wave exists within said enclosed volume, said resonant pressure wave being identified with oscillatory motions of at least a portion of said inert gas at an oscillation frequency, a velocity node exists within said first specific region, said velocity node has pressure wave pressure range which is greater than the pressure wave pressure range at the interior surface of said rigid shell, said first means for conducting said first quantity of said feedstock gas from said source of feedstock gas to said specific region within said enclosed volume within said rigid shell permits said oscillatory motions of at least a portion of said inert gas which said oscillatory motions are radially oriented with respect to said first specific region.

2. Apparatus as in claim 1 wherein:

said rigid shell is spherical.

3. Apparatus as in claim 1 wherein:

said first means for conducting said first quantity said feedstock gas from said source of feedstock gas to a first specific region within said enclosed volume within said rigid shell comprises a separating wall which is radially oriented with respect to said first specific region.

4. Apparatus as in claim 3 wherein:

said separating wall which is radially oriented with respect to said first specific region is a tapered nozzle.

5. Apparatus as in claim 4 wherein:

said tapered nozzle has an exit proximate to said velocity node which exists within said first specific region.

6. Apparatus as in claim 1 wherein:

said first means for conducting said first quantity said feedstock gas from said source of feedstock gas to a first specific region within said enclosed volume within said rigid shell comprises at least one modular subassembly which allows passage of said first quantity of feedstock gas from said source of feedstock gas to said first specific region while minimizing passage of pressure wave fluctuations from said enclosed internal volume to said source of feedstock gas.

7. Apparatus as in claim 6 wherein:

said modular subassembly comprises a tube defining a contained interior volume, said tube being of such size that a resonant pressure wave in said tube will have a frequency equal to the resonant frequency in said rigid shell, a first end of said tube being joined to said first aperture in said rigid shell so that said contained interior volume within said tube is in communication with said enclosed volume within said rigid shell and a second aperture in said tube located proximate to a pressure node in said tube and wherein said quantity of feedstock gas enters said tube through said second aperture and passes to said enclosed volume within said rigid shell through said first end of said tube.

8. Apparatus as in claim 6 wherein:

said modular subassembly comprises a first spherical half shell and a half shell cover, said modular subassembly having first and second apertures therein, said first aperture being in said half shell cover, said half shell and said half shell cover being joined at their peripheries and together defining a hemispherical interior volume, said hemispherical interior volume being of such size that the frequency of a resonant pressure wave within said hemispherical interior volume will be equal to said frequency of said resonant pressure wave in said rigid shell, said first aperture in said shell cover being joined to said first aperture in said rigid shell, said first quantity of feedstock gas passing in sequence from said source of feedstock gas through said second aperture in said modular subassembly, through said hemispherical interior volume, through said first aperture in said modular subassembly and into said first specific region.

9. Apparatus as in claim 6 wherein:

said modular subassembly comprises a first flared tube and a flared tube end cover, the smaller end of said first flared tube being joined to said first aperture in said rigid shell, the larger end of said flared tube being closed by said flared tube end cover, an aperture in said modular subassembly, said flared tube and flared tube end cover defining an enclosed interior volume of such size that the frequency of a resonant pressure wave within said enclosed interior volume within said flared tube will be equal to said frequency of said resonant pressure wave in said rigid shell, said first quantity of feedstock gas passing in sequence from said source of feedstock gas through said aperture in said modular subassembly, through said enclosed interior volume defined by said flared tube and said flared tube end cover and through said first aperture in said rigid shell and into said first specific region.

10. Apparatus as in claim 6 wherein:

said modular subassembly comprises a first flared tube and a vessel, the smaller end of said first flared tube being joined to said first aperture in said rigid shell, the larger end of said flared tube being joined to a vessel, an aperture in said modular subassembly, said flared tube and vessel defining an enclosed interior volume of such size that the frequency of a resonant pressure wave within said enclosed interior volume within said flared tube and vessel will be equal to said frequency of said resonant pressure wave in said rigid shell, said first quantity of feedstock gas passing in sequence from said source of feedstock gas through said aperture in said modular subassembly, through said enclosed interior volume defined by said flared tube and said vessel and through said first aperture in said rigid shell and into said first specific region.

11. Apparatus as in claim 6 further having a second means for conducting said first quantity said feedstock gas from said source of feedstock gas to a first specific region within said enclosed volume within said rigid shell, said second means for conducting a comprises at least a second modular subassembly which allows passage of said first quantity of feedstock gas from said source of feedstock gas to said first specific region while minimizing passage of pressure wave fluctuations from said enclosed internal volume to said source of feedstock gas.

12. Apparatus as in claim 1 having means for causing rotation of at least a portion of said quantity of inert gas which is located within said rigid shell about said first quantity of feedstock gas.

13. Apparatus as in claim 13 wherein said means to cause rotation of at least a portion of said quantity of inert gas comprises a nozzle which directs gas into said enclosed volume.

14. Apparatus as in claim 13 wherein said nozzle is tangentially oriented with respect to said rigid shell.

15. Apparatus comprising:

a source of feedstock gas, a rigid shell defining an enclosed interior volume, first means for conducting a first quantity of said feedstock gas from said source of feedstock gas to a first specific region within said enclosed volume within said rigid shell, a quantity of inert gas located within said rigid shell, a resonant pressure wave existing within said enclosed volume, said resonant pressure wave being identified with oscillatory motions of at least a portion of said inert gas at an oscillation frequency, a velocity node of said resonant pressure wave being located within said first specific region, said first means for conducting said first quantity said feedstock gas from said source of feedstock gas to said specific region within said enclosed volume within said rigid shell permits oscillatory motions of at least a portion of said inert which oscillatory motions are radially oriented with respect to said first specific region.

16. Apparatus comprising:

a sink for a product gas, a rigid shell defining an enclosed interior volume, first means for conducting a first quantity of said product gas from a first specific region within said enclosed volume within said rigid shell to said sink, a quantity of inert gas located within said rigid shell, wherein a resonant pressure wave exists within said enclosed volume, said resonant pressure wave being identified with oscillatory motions of at least a portion of said inert gas at an oscillation frequency, a velocity node exists within said first specific region, said velocity node has pressure wave pressure range which is greater than the pressure wave pressure range at the interior surface of said rigid shell, said first means for conducting said first quantity said product gas from said first specific region within said enclosed volume within said rigid shell to said sink permits oscillatory motions of at least a portion of said inert which oscillatory motions are radially oriented with respect to said first specific region.

17. Apparatus as in claim 16 wherein:

said rigid shell is spherical.

18. Apparatus as in claim 16 wherein:

said first means for conducting said first quantity said product gas from said first specific region within said enclosed volume within said rigid shell to said sink comprises a separating wall which is radially oriented with respect to said first specific region.

19. Apparatus as in claim 18 wherein:

said separating wall which is radially oriented with respect to said first specific region is a tapered nozzle.

20. Apparatus as in claim 19 wherein:

said tapered nozzle has an exit proximate to said velocity node which exists within said first specific region.

21. Apparatus as in claim 16 wherein:

said first means for conducting said first quantity said product gas from said specific region within said enclosed volume within said rigid shell to said sink for product gas comprises means to cause rotation of at least a portion of said quantity of inert gas which is located within said rigid shell about said first quantity of feedstock gas.

22. Apparatus as in claim 16 wherein:

said first means for conducting a first quantity said product gas from said first specific region within said enclosed volume within said rigid shell to said to sink for product gas comprises at least one modular subassembly which allows passage of said first quantity of product gas from said first specific region within said enclosed volume within said rigid shell to said sink for product gas while minimizing passage of pressure wave fluctuations from said enclosed internal volume to said sink for product gas.

* * * * *